United States Patent [19]

Yamanaka et al.

[11] Patent Number: 4,492,114
[45] Date of Patent: Jan. 8, 1985

[54] APPARATUS FOR DETECTING COMBUSTION TIMING

[76] Inventors: Teruo Yamanaka, 1756-2, Aza Hosoguchi-shita, Oaza Hirabari, Tempaku-cho, Tempaku-ku, Nagoya-shi, Aichi-ken; Kizo Hayakawa, 41-2, Higashiyashiki, Takayokosuka-cho, Tokai-shi, Aichi-ken; Yasuhiko Suzuki, 8, Yamane-cho, Tempaku-ku, Nagoya-shi, Aichi-ken; Michiru Esaki, 2, Uezono-cho 2-chome, Meito-ku, Nagoya-shi, Aichi-ken, all of Japan

[21] Appl. No.: 496,656

[22] Filed: May 20, 1983

[30] Foreign Application Priority Data

May 25, 1982 [JP] Japan .................. 57-88290

[51] Int. Cl.³ .................................. G01M 15/00
[52] U.S. Cl. .................... 73/117.3; 73/119 A
[58] Field of Search .............. 73/116, 117.3, 119 A, 73/660

[56] References Cited
U.S. PATENT DOCUMENTS 4,337,648  7/1982  Gillespie ........................ 73/117.3
4,403,504  9/1983  Krage et al. ....................... 73/116

Primary Examiner—Jerry W. Myracle
Attorney, Agent, or Firm—Oblon, Fisher, Spivak, McClelland & Maier

[57] ABSTRACT

An apparatus for detecting combustion timing in an internal combustion engine comprises: a microwave unit including a microwave oscillator for generating a microwave having a predetermined frequency, a transmission and reception separator for separating transmitted and received microwaves from each other, and a detector for detecting the received microwave so as to be converted to a low frequency signal; a probe including a microwave sensor for radiating the microwave from the separator into a combustion chamber and receiving a reflected wave, and a light sensor for electrically detecting light emitted upon combustion in the combustion chamber; and a processing unit including a peak detector circuit for detecting peaks of a microwave signal supplied by the detector, a luminous signal processor for detecting a peak value of a luminous signal supplied by the light sensor in each cycle and also detecting the time when the luminous signal reaches an intensity having a predetermined proportion to the peak value thereof, and an operating unit for operating a time difference between a middle point between a pair of peaks of the microwave signal and the time when the luminous signal reaches an intensity having a predetermined portion to the peak value thereof based on peak and luminous signals. The apparatus accurately detects the timing for starting combustion with respect to a top dead center of the internal combustion engine.

16 Claims, 6 Drawing Figures

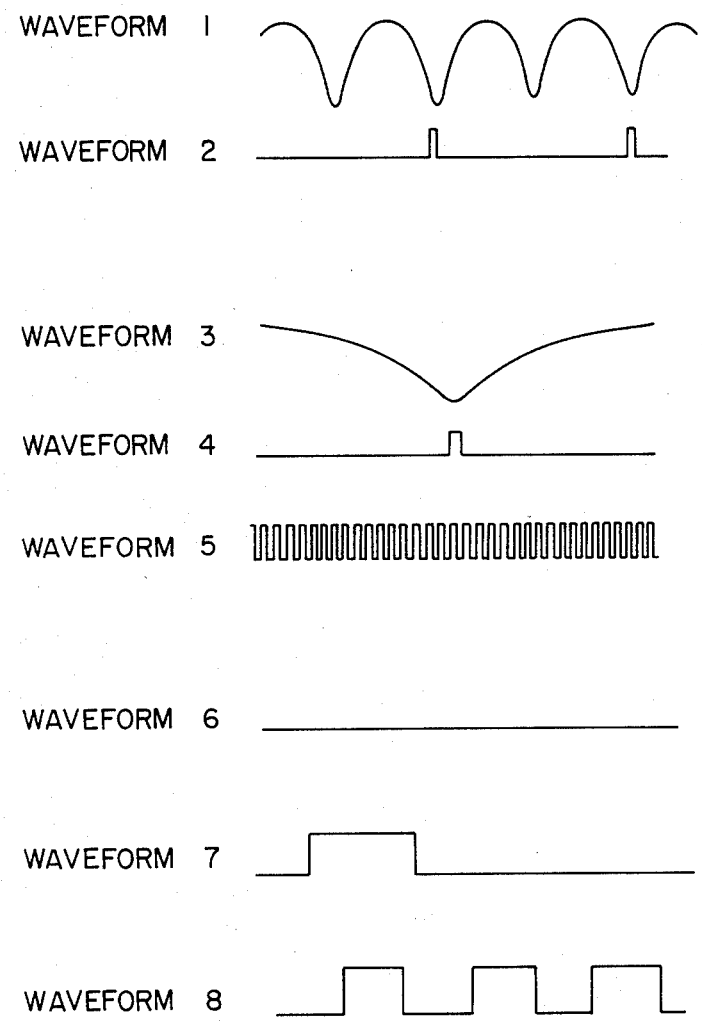

APPARATUS FOR DETECTING COMBUSTION TIMING

BACKGROUND OF THE INVENTION

1. Field of the Invention

The present invention relates to an apparatus for detecting timing for starting the combustion in an internal combustion engine based on a microwave signal and a luminous signal.

2. Description of the Prior Art

Improved exhaust emission and fuel economy for internal combustion engines strongly require accurate detection of conditions in the combustion chambers, the top dead center position, and fuel injection and ignition timing with respect to the top dead center while the engine is in operation. Such accurate detection of condition and timing is also useful for analyzing combustion to achieve the better emission and mileage. Reflecting the recent trend for more delicate combustion control, there is a strong demand on production lines for an apparatus capable of accurately and simply determining whether manufactured internal combustion engines inject fuel at desired timing or angle with respect to the top dead center and ignite the air-fuel mixture.

More and more diesel engines are used on passenger cars because of their better fuel economy. Since diesel engines found widespread use much later than gasoline engines and fail to provide ready information for timing detection, more need has arisen particularly recently for a timing detecting apparatus for use with diesel engines.

Pollutants HC and NOx in the exhaust gas discharged from diesel engines vary greatly in amount when injection timing of the fuel injection pump deviates from a setting even by 1 degree in terms of crank angle. Therefore, it has heretofore been difficult to control the accuracy of fuel injection timing in mass-produced diesel engines. It has been necessary to determine statically two relative positions, that is, a standard crank angle position and an injection pump attachment position, which serve as a reference for injection timing, and the accuracy of determined injection timing has been on the order of several degrees.

With mass-produced diesel engines, consequently, it has to take into account that the injection timing of the fuel injection pump is variable in ±3° of a setting. The diesel engines should be equipped with an exhaust emission control device such as EGR (Exhaust Gas Recirculation) to meet the emission control requirements even when the injection timing happens to differ from the setting. Therefore, the overall engine system is complex and the fuel economy is poor.

To avoid such problems, an adjustment system has been put to use which is capable of dynamic timing adjustment with the accuracy of ±0.5°, by utilizing microwave resonance as described in U.S. Pat. No. 3,589,177.

There is an adjustment system utilizing the phenomenon of microwave resonance, which detects the top dead center and represents fuel injection timing with a luminous signal generated upon fuel combustion in a pre-chamber. The difference in crank angle between the detection of the top dead center and the luminous signal is detected and adjusted so as to be within ±0.5° of the setting by automatically changing the injection pump attachment position with a stepper motor.

The adjustment system comprises a microwave unit for generating and detecting a microwave, a probe for introducing the microwave into the engine and detecting light emitted from the pre-chamber as a luminous signal, an encoder for picking up a crank angle signal, an electronic circuit for determining a top dead center by processing the microwave signal based on the crank angle signal from the encoder, determining the crank angle difference between the luminous signal from the pre-chamber and the detection of the top dead center, and delivering a command signal to a stepper motor so as to bring the crank angle difference into conformity with a setting, and the stepper motor for changing an injection pump attachment position.

The waveform and peak value of the luminous signal generated from the pre-chamber vary with the load on and the speed of the engine, and the degree of variation in the waveform and the peak value is different in each cycle. Under low loads, in particular, the waveform and the peak value tend to vary by 50% in each cycle. It has been customary practice to detect the luminous signal simply in terms of the time or angle at which the luminous signal exceeds a preset level, the detected time or angle being indicative of a rise time for the luminous signal. This rise time varies widely depending on operating conditions, resulting in a poor accuracy of the system. To avoid such a difficulty, it has been necessary to keep the engine load at a low level, 1,300 RPM for example, for thereby reducing the variation of the luminous signal from the pre-chamber in each cycle. An additional device is therefore required for maintaining the engine under such a load condition. Since the engine operating range that can be detected is limited, the sensor is less effective in operation.

Since the microwave resonance is caused dependent on the piston position, the microwave signal indicative of the top dead center is available as a time signal while the engine is in rotation. The amounts of harmful components NOx and HC in the exhaust gas are determined by the crank angle position of the fuel injection pump, and hence the top dead center should be found as a crank angle. Therefore, an angle signal has also been employed. High accuracy required of such an angle signal has precluded the use of an ordinary angle sensor used on engines, such as a sensor composed of an electromagnetic pickup simply attached to a ring gear, as the sensor fails to provide a sufficient accuracy (±0.1°). Conventionally, an angle sensor and an encoder which are of higher accuracy should be attached through a shaft driver and the like in each adjustment process.

It has been troublesome to attach the angle sensor and encoder each time an adjustment is to be made. The time required for measurement has been increased. An engine attachment system should newly be added. In addition, special consideration should be given to accuracy and reliability since the accuracy is dependent on the angle sensor and encoder. The sensor accuracy cannot be diagnosed by the output from the sensor itself. This has necessitated higher accuracy and reliability of the encoder and also higher reliability and reconstructibility of the engine attachment system.

SUMMARY OF THE INVENTION

The present invention has been reached through systematic experiments and theoretical analyses which the inventors have carried out in an effort to develop an apparatus which will solve the problems with the conventional apparatus.

It is an object of the present invention to provide an apparatus for accurately detecting combustion timing in an internal combustion engine.

It is another object of the present invention to provide a simple apparatus for accurately detecting injection timing of the fuel.

It is a further object of the present invention to provide an apparatus being handled easily and put to sufficient practical use.

An apparatus for detecting combustion timing according to the present invention comprises: a microwave unit comprising a microwave oscillator for generating a microwave having a predetermined frequecy, a transmission and reception separator connected to the microwave oscillator, for separating transmitted and received microwaves from each other, and a detector connected to the transmission and reception separator, for detecting the received microwave so as to be converted to a low frequency signal; a probe means comprising a microwave sensor connected to the separator, for radiating the microwave from the separator into a combustion chamber of the internal combustion engine and receiving a reflected wave, and a light sensor for electrically detecting light emitted upon combustion in the combustion chamber; and a processing unit comprising a peak detector, connected to the detector of the microwave unit, for detecting peaks of a microwave signal supplied by the detector, a luminous signal processor, connected to the light sensor of the probe means, for detecting a peak value of a luminous signal supplied by the light sensor in each cycle and also detecting the time when the luminous signal reaches an intensity having a predetermined proportion to the peak value thereof, and an operating unit, connected to the peak detector and luminous signal processor, for operating a time difference between a middle point between a pair of peaks of the microwave signal and the time when the luminous signal reaches an intensity having a predetermined portion to the peak value thereof based on peak and luminous signals, thereby detecting the timing for starting combustion with respect to a top dead center of the internal combustion engine.

The combustion timing detecting apparatus of the foregoing construction detects the peak value of the luminous signal in each cycle and also the time when the luminous signal reaches an intensity having the predetermined proportion to the peak value. Ignition and combustion conditions in combustion chambers of internal combustion engines generally vary with uncontrollable conditions in which the engine operates. Since the ignition and combustion conditions are largely varied in each cycle under a low engine load, the peak value of the luminous signal also varies widely. The apparatus of the invention detects the luminous signal as a value relative to its peak value in each cycle. Accordingly, the combustion starting timing can be detected with high accuracy even when the engine operating condition varies and internal combustion engines undergo different combustion conditions.

The apparatus according to the present invention is a simple system having a single probe for detecting a microwave and a luminous signal. The system can easily be mounted and detached, and can be put to sufficient practical use.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIGS. 2 through 6 are diagrams showing an apparatus according to an embodiment of the present invention in which FIG. 2 is a block diagram of the apparatus, FIG. 3 is a cross-sectional view of a probe in the apparatus, FIG. 4 is a timing chart showing output signals from components of a processor in the apparatus, FIG. 5 is a flowchart illustrating processing steps executed by a microcomputer in the apparatus, and FIG. 6 is a diagram showing signal waveforms explanatory of time-to-angle conversion according to the apparatus.

DETAILED DESCRIPTION

The principles of detecting operation of the combustion timing detecting apparatus of the present invention will be described below.

Figure 1:
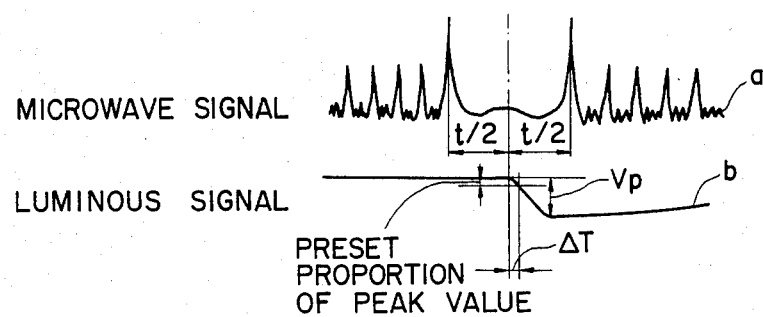
FIG. 1 is a diagram showing various signals, illustrative of the principles of the present invention.

The combustion chamber of the engine is defined by a closed curved surface of metal. When the piston is not in a position which meets a resonance condition under which a microwave electromagnetic field can exist, the microwave introduced over a microwave coaxial cable into the combustion chamber is totally reflected. With the combustion chamber regarded as a cylinder, it resonates each time the piston moves from the top dead center to positions of half wavelengths, and the microwave introduced into the combustion chamber through the probe is absorbed on each resonance and converted to Joule heat at the cylinder wall. The microwave which is thus absorbed each time the piston arrives at the resonance positions during engine operation has a waveform indicated at a in FIG. 1. Since the waveform is symmetric in shape with respect to the top dead center, the middle point between a pair of peaks of the waveform is indicative of the top dead center as used in the present invention. According to the present invention, the middle point between a pair of peaks of the microwave is detected by utilizing two peaks prior and subsequent to the top dead center and closest thereto. In FIG. 1, the position of the top dead center on a time base for the microwave is shown by the dot-and-dash line, and will hereinafter be referred to as a "microwave top dead center".

A rise time of a luminous signal generated upon the combustion in the combustion chamber is regarded as a substitute signal corresponding to combustion starting timing, and the combustion starting signal with respect to the top dead center is detected as a time difference ($\Delta T$ in FIG. 1) from the time of occurrence of the middle point between a pair of peaks of the microwave to the rise time of the luminous signal.

The rise time of a luminous signal produced upon the combustion in the combustion chamber is determined by detecting the peak value of the waveform (indicated by b in FIG. 1) of the luminous signal and finding the time at which the luminous signal reaches an intensity having a predetermined proportion to the peak value. The intensity proportion can be determined taking into account the level of a noise signal on the waveform b and other considerations.

According to the present invention, the timing at which the combustion is started is detected as the time at which the luminous signal from the combustion chamber reaches the intensity having the predetermined proportion to the peak value thereof. Since the timing is thus detected on the basis of relative intensity of the luminous signal, the timing is not affected even when the combustion condition varies due to uncontrollable engine operating conditions. As a result, the combustion starting timing with respect to the top dead center can be detected accurately.

The peak value of the intensity of the luminous signal varies nearly 50% when the engine runs under no load or at a low engine speed. With the invention, nonetheless, the rise time of the luminous signal can be detected much more accurately than it has been detected on the basis of the time at which the luminous signal intensity exceeds a certain intensity level.

The apparatus for detecting combustion timing can be reduced to practice in the following manner.

According to a first aspect of the present invention, a time difference between the time of the middle point between a pair of peaks of the microwave and the time when the luminous signal reaches an intensity having a predetermined proportion to the peak value thereof is converted to a crank angle difference by a conversion coefficient which is dependent on the engine speed for converting time differences to the crank angle differences.

The engine-speed-dependent crank angle conversion coefficient is stored previously in a memory device or computed. Fuel injection timing can accurately be detected as a crank angle with respect to the top dead center without using an additional sensor such as an encoder for deriving angular information as with conventional apparatus. Accordingly, the overall system is of a simplified construction, can be mounted and detached with ease, and is reliable in operation. The apparatus according to the first aspect is more advanced in technical achievement than the prior apparatus employing a sensor such as an encoder for deriving angular information. The apparatus of the invention is implemented with ease based on the inventors' finding that angular conversion which has been considered difficult to achieve is effected by a conversion coefficient which is a function of the engine speed.

According to a second aspect of the present invention, a time difference between the times of the middle point between a pair of peaks of the microwave and the time when the luminous signal reaches an intensity having a predetermined proportion to the peak value thereof are averaged and statistically processed to find a standard deviation, which will be confirmed as falling within a set range.

According to the second aspect, the timing detection is performed with higher accuracy, and there is a function of monitoring at all times whether the engine and the probe are in normal conditions by confirming that the standard deviation is within the set range.

An apparatus according to an embodiment of the present invention will be described with reference to FIGS. 2 through 6.

The apparatus for detecting combustion timing according to this embodiment is applied for detecting timing of fuel injection in a diesel engine having a pre-chamber.

Specifically, a microwave is radiated from the pre-chamber into a main chamber of the diesel engine, and a top dead center is detected from the time of the middle point between a pair of peaks of the microwave through resonance in the cylindrical main chamber. Fuel injection timing with respect to the top dead center is detected by detecting a time difference between the time of the middle point between a pair of peaks of the microwave and the time when a luminous signal from the pre-chamber reaches 10% of a peak value thereof.

Experiments conducted by the inventors have revealed that although in a strict sense the fuel injection timing differs from the time when the luminous signal produced upon combustion reaches 10% of its peak value since fuel in the combustion chamber is ignited and combusted after it has been injected by a fuel injection device, the time difference remains constant under all operating conditions, and can be used sufficiently as a substitute signal for a fuel injection timing signal. The present embodiment has been practiced based on this finding.

Figure 2:
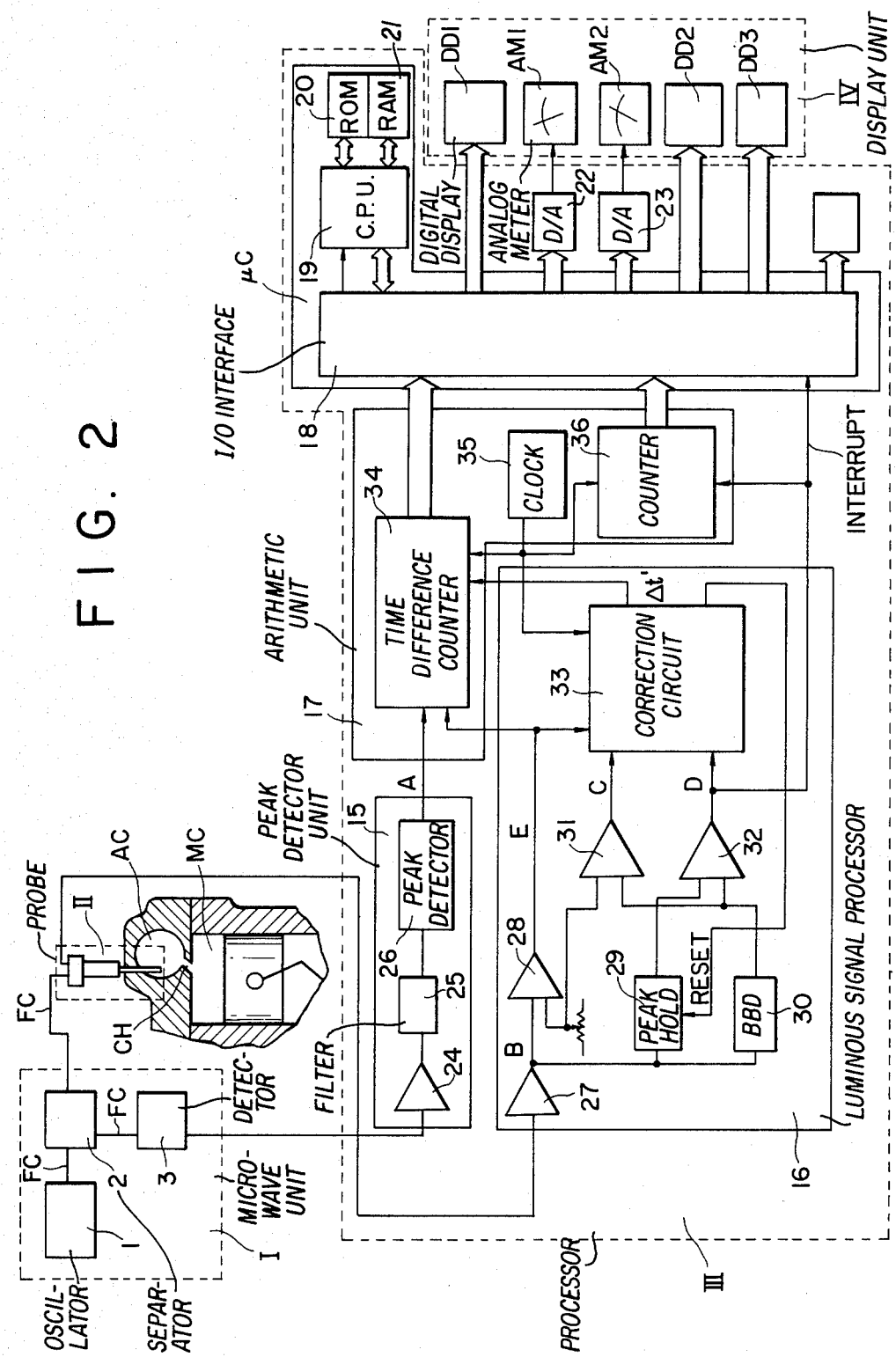
Figure 4:
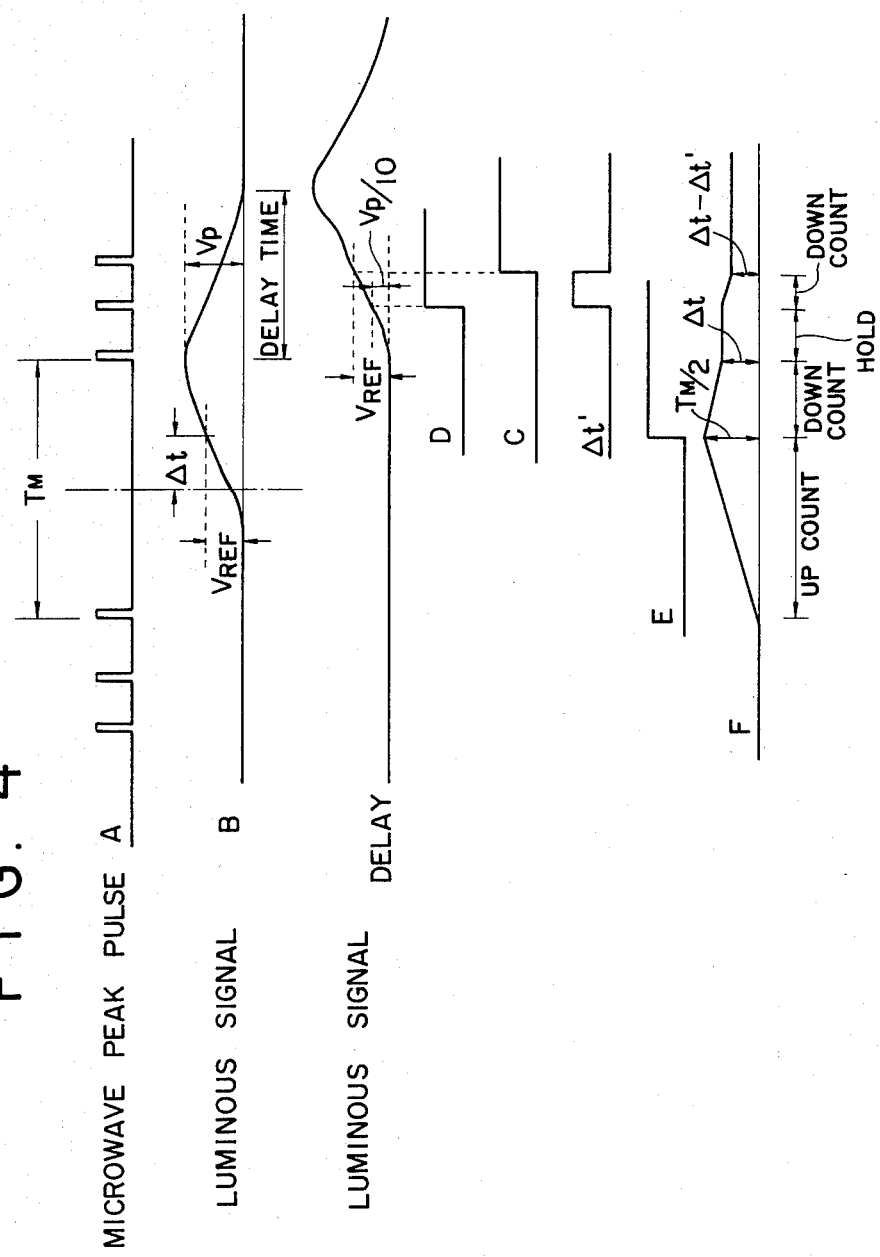

The combustion timing detecting apparatus according to this embodiment comprises, as illustrated in FIG. 2: a microwave unit I for generating a microwave having a predetermined frequency and converting a received microwave into a low-frequency signal; a probe II for radiating the microwave into a pre-chamber of a combustion chamber and receiving the microwave as reflected therefrom and for detecting light emitted upon ignition and combustion in the pre-chamber; a processor III for detecting a top dead center of the engine from the time of the middle point between a pair of peaks of the microwave prior and subsequent to a top dead center on the resonant waveform of the microwave and also detecting the time of fuel injection from the time when a luminous signal reaches an intensity having a predetermined proportion (about 10%) to a peak value thereof as determined in each engine cycle, and for detecting a time difference between the time of the top dead center and the fuel injection time to thereby determine fuel injection timing; and a display unit IV for indicating the detected fuel injection timing.

The microwave unit I is composed of a microwave oscillator 1 for generating a microwave, a transmission and reception separator 2 for separating transmitted and received microwaves from each other, and a detector 3 for detecting and converting the received microwave into a low-frequency signal.

Microwave oscillator 1 is in the form of a gunn diode oscillator including a solid-state oscillating device, a gunn diode, attached to a waveguide resonator. The microwave oscillator 1 is also has a varactor diode for effecting electronic tuning up to a maximum of 80 MHz. The frequency of the waveguide resonator is mechanically variable in the range of ±250 MHz.

The microwave oscillator 1 is set to an oscillation frequency of 18 GHz. The apparatus of this embodiment utilizes the fact that the metal wall surface of the closed combustion chamber such as an engine cylinder constitutes a cavity resonator. Since the resonance occurs in a plurality of piston positions corresponding to resonance modes of the cylindrical combustion chamber, a microwave radiated into the combustion chamber while the engine is rotating is resonated in the predetermined piston positions and the reflected wave is absorbed. The absorbed waveform appears symmetrical with respect to the top dead center as it corresponds to the piston resonant positions. The top dead center can be determined by detecting the middle point between a pair of peaks which are closest to the top dead center.

An engine in which the present embodiment is incorporated has a combustion chamber composed of a main chamber and a pre-chamber interconnected by a throat CH that can be regarded as a microwave waveguide and has a cutoff frequency for the microwave. Because cylindrical resonance in the main chamber of the combustion chamber is utilized according to the embodiment, it is necessary that the microwave be led into the main chamber and the oscillation frequency be set above the cutoff frequency. The cutoff frequency is normally about 10 GHz, and the oscillation frequency is selected to be 18 GHz according to this embodiment.

As the microwave frequency is varied, the resonance modes of the combustion chamber change. By increasing the oscillation frequency of the microwave above the cutoff frequency, the resonant positions of the piston proportionally approach the top dead center. The microwave oscillator 1 and the probe II are interconnected by a flexible cable FC which attenuates the microwave by an amount that increases as the microwave frequency goes higher. The amount of such microwave attenuation varies widely when the flexible cable FC vibrates, resulting in an increase in noise of the microwave signal. In view of the foregoing, a sophisticated technical expedient is required in constructing the apparatus. To this end, the oscillation frequency is selected to be 18 GHz. As a consequence, the resonance is caused to take place at a position about 8 mm from the top dead center in terms of piston stroke, the position being converted into the crank angle of 30 degrees prior and subsequent to the top dead center in the engine in which the present embodiment is applied.

An isolator with a reverse loss of 20 dB is attached to an output terminal of the microwave oscillator 1 for protecting the latter against damage due to reflection from the load and preventing variations in the frequency and output. The microwave oscillator 1 is supplied with power from a DC constant-voltage regulated power supply. To avoid electromagnetic interferences, an EMI filter is coupled to a power input terminal of the microwave oscillator 1. The EMI filter is designed to be highly effective for frequencies higher than 20 MHz. The microwave oscillator is mounted on a heat sink made of aluminum having a good thermal conductivity and forcibly air-cooled by an air cooling fan. A thermistor is also mounted on the heat sink for detecting the temperature of the microwave oscillator 1. The frequency produced by the microwave oscillator 1 is lowered 0.9 MHz for each temperature change of 1° C. A change in the frequency of the microwave oscillator 1 due to temperature change is measured by the temperature as measured by the thermistor, and the voltage across the varactor diode is proportionally changed in order to reduce any temperature-dependent change in the oscillation frequency of the microwave oscillator 1. As a result, the frequency variation is confined to 1 MHz or below for a temperature change in the range of from 10° C. to 40° C. To effect this operation, the varactor terminals of the microwave oscillator 1 are connected to the processor III. The microwave oscillator 1 is coupled with the power supply through a relay so as to be protected against damage which would otherwise be occasioned by spike noise produced when the power supply is turned on and off. Therefore, the microwave oscillator 1 operates with a time delay with respect to the turning on and off of the power supply. The power supply is so designed that it will be automatically switched off and an alarm buzzer will be energized when the temperature of the heat sink exceeds 45° C.

The transmission and reception separator 2 is composed of a three-terminal circulator having one terminal connected to the microwave oscillator 1 through a flexible coaxial microwave cable FC and one terminal connected to the probe II through a similar flexible coaxial microwave cable FC.

The detector 3 is connected to the third terminal of the circulator 2 through a flexible coaxial cable FC for detecting and converting the microwave received from the probe II into a low-frequency electric signal. The detector 3 is of a negative porality such that a negative voltage becomes higher as the microwave intensity increases.

Figure 3:
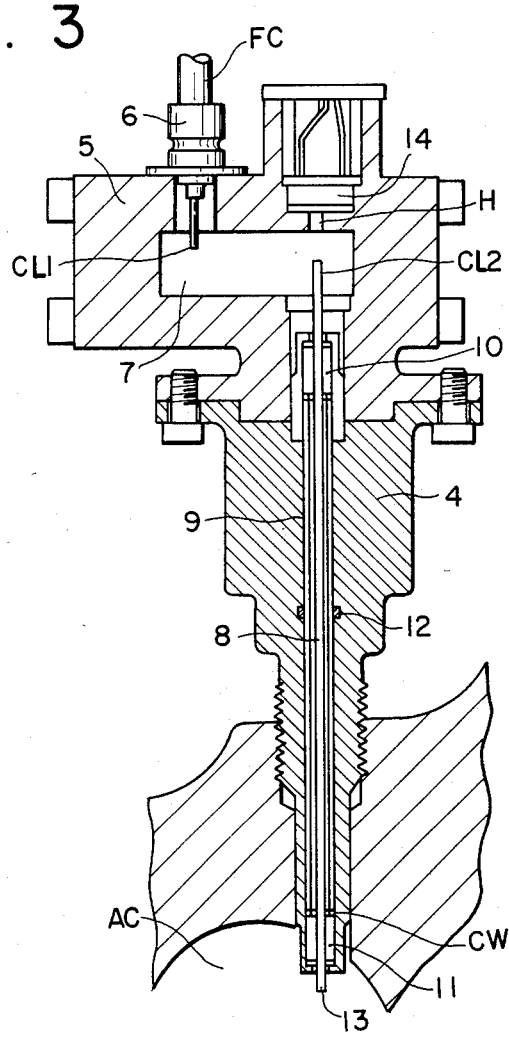

As illustrated in FIG. 3, the probe II comprises a hollow cylindrical body 4 having a flange, and a chamber body 5 disposed above the hollow cylindrical body 4 and mounted thereon by a flange which is coupled to the flange of the hollow cylindrical body 4. The probe II also includes components, described below, mounted on and in the hollow cylindrical body 4 and the chamber 5.

A microwave connector 6 is secued to an upper portion of the chamber body 5 and connected to the flexible microwave cable FC which is coupled to the circulator 2. The microwave connector 6 has a central conductor CL1 with its end projecting into a chamber 7 defined in the chamber body 5 and serving as a waveguide by a distance of 4 mm which is equal to $\frac{1}{4}$ of the wavelength of the microwave. The central conductor CL1 is disposed in a position spaced from a sidewall of the chamber 7 by a distance equal to $\frac{1}{2}$ of the wavelength in the waveguide. The chamber 7 thus constitutes a coaxial waveguide converter.

In the hollow cylindrical body 4, there are placed two metal tubes of different diameters, one constituting a coaxial air-line inner conductor 8 and the other a coaxial air-line outer condutor 9 which is coaxial with the inner conductor 8. A space is left between the two metal tubes. Annular window members 10, 11 of quartz are located at the upper and lower ends of the metal tubes and serve as both support spacers and seals. The characteristic impedance of the metal tubes is selected to be 50 ohms in the range of microwaves.

The coaxial air-line inner conductor 8 has an outside diameter of 1 mm, and the coaxial air-line outer conductor 9 has an inside diameter of 2.3 mm. The coaxial air-line inner and outer conductors 8, 9 are made of stainless steel for required heat resistance and mechanical strength. The outer surface of the coaxial air-line inner conductor 8 and the inner surface of the coaxial air-line outer conductor 9 are plated with gold. The coaxial air-line inner conductor 8 is in the form of a stainless steel pipe having an inside diameter of 0.5 mm to prevent the coaxial air-line inner and outer conductors 8, 9 from varying in their relative position due to vibrations during engine operation, and hence to prevent resulting changes in the characteristic impedance and the microwave intensity. An O-ring 12 of rubber is inserted between the coaxial air-line outer conductor 9 and an inner wall of the hollow cylindrical body 4 to provide a seal on the coaxial air-line outer conductor 9 against an engine pre-chamber AC.

The quartz window members 10, 11 which support the coaxial air-line inner conductor 8 have their respective opposite ends optically ground to allow loss-free passage of light from the pre-chamber AC through the window members 10, 11. To avoid reflection due to impedance mismatching because quartz has a relative dielectric constant of 4, the quartz window members 10, 11 are about 4 mm long which is ½ of the wavelength within quartz, so that reflected waves are cancelled by each other at the opposite surfaces of the quartz window members. Thus, the window members 10, 11 are rendered unreflective.

The coaxial air line has a distal end projecting into the pre-chamber AC and serving as a dipole antenna 13 which needs no adjustment in its attachment angle (in the circumferential direction). The dipole antenna 13 projects 3 mm from one end of the cylindrical body 4. If the quartz window member 11 were directly exposed to the pre-chamber AC, unburned fuel and as a result carbon would be attached to the window member 11, and the deposited carbon layer would greatly attenuate light as emitted in the pre-chamber AC and entering the window member 11, with the result that the emitted luminous signal from the pre-chamber AC could not be detected. Such a difficulty is prevented by locating the quartz window member 11 at a position recessed 2.3 mm from the end of the air line in the pre-chamber. This prevents any unburned fuel and diesel particulate from being deposited on the window member 11.

The quartz window members 10, 11 are bonded to the outer peripheral wall of the coaxial air-line inner conductor 8 by a ceramic adhesive with its bonding strength that is not degraded up to a high temperature of 1,000° C. A copper washer CW is interposed between the quartz window member 11 and the coaxial air-line outer conductor 9 to provide a seal therebetween.

The coaxial air-line inner conductor 8 has an upper end CL2 projecting into the chamber 7 which serves as the coaxial waveguide converter in the chamber body 5. A hole H is defined in a wall of the chamber body 5 upwardly of and coaxially with the projecting end CL2 of the inner conductor 8. A photodiode 14 is mounted in the chamber body 5 adjacent to the hole H for converting light emitted from the pre-chamber AC into a luminous signal so that light emitted upon ignition and combustion of fuel in the pre-chamber AC can most efficiently be detected. The hole H has a diamter of 2 mm, a dimension which does not adversely affect the microwave.

The hollow cylindrical body 4 has an externally threaded outer peripheral wall which is held in threaded engagement with an internally threaded wall in a cylinder head that supports a glow plug. The probe II is thus secured to the cylinder head with its distal end projecting into the pre-chamber AC by a predetermined distance.

As shown in FIG. 2, the procesor III comprises: a microwave peak detecting device 15; a luminous signal processor 16; an arithmetic unit 17 for computing a time difference; a microcomputer $\mu$C including an I/O interface 18, a central processing unit 19, a ROM 20 and a RAM 21; and two D/A converters 22, 23.

The microwave peak detecting device 15 comprises an amplifier 24 connected to the detector 3 in the microwave unit I, a bandpass filter 25 connected to the amplifier 24, and a peak detector 26 coupled to the bandpass filter 25.

The amplifier 24 serves to amplify, without changing the polarity, the low-frequency signal converted by the detector 3 from the microwave. The bandpass filter 25 has a pass band in the range of from 10 Hz to 500 KHz.

The peak detector 26 detects the peak value of a signal issued from the bandpass filter 25 and sets up a threshold level that is a suitable percent (about 50%) of the output from a low-pass filter. The threshold level and the output from the bandpass filter 25 are compared by a comparator, which produces a rectangular pulse signal (indicated at A in FIG. 4) with its pulses correspondingly respectivley to the peaks of the microwave.

The luminous signal processor 16 is composed of an amplifier 27 conected to the photodiode 14 in the probe II, a first comparator 28 conected the amplifier 27, a peak hold circuit 29 connected to the amplifier 27 and having a reset terminal connected to a correction circuit 33 (described later), a BBD circuit 30 connected as a delay device to the amplifier 27, a second comparator 31 connected to an output terminal of the BBD circuit 30, a third comparator 32 connected to an output terminal of the peak hold circuit 29 and the output terminal of the BBD circuit 30, and a correction circuit 33 conected to the first through third comparators 28, 31, 32.

Systematic experiments and analyses made by the inventors have indicated that the time when the luminous signal generated upon ignition in the pre-chamber reaches 10% of its peak value corresponds best to fuel injection timing. Based on such a finding, the luminous signal processor 16 is constructed on a logic such that in order to detect fuel injection timing from a time difference with a middle point bewteen a pair of peaks of the microwave signal, only the luminous signal is delayed for comparison between the microwave signal and the luminous signal, and the time difference with the middle point between a pair of peaks is determined using as a reference value a suitable peak value which may not necessarily correspond to 10% of the peak value, and thereafter correction is made by the time difference between the reference value and 10% of the peak value.

The amplifier 27 serves to amplify the luminous signal emitted from the pre-chamber AC and fed by the photodiode 14. The first comparator 28 compares the amplified luminous signal (shown at B in FIG. 4) delivered from the amplifier 27 with a preset reference value, and produces an output. The peak hold circuit 29 detects a peak value of the amplified luminous signal and produces an output which is 10% of the deteced peak value. The BBD circuit 30 delays the amplified luminous signal for a given interval of time, and delivers the delayed luminous signal. The second comparator 31 compares the delayed luminous signal from the BBD circuit 30 with a reference value which is equal to that in the first comparator 28, and issues an output signal (indicated at C in FIG. 4). The third comparator 32 compares 10% of the peak value of the luminous signal with the delayed luminous signal, and produces an output signal (shown at D in FIG. 4). The correction circuit 33 produces as an output a correction-interval pulse signal (shown at $\Delta t'$ in FIG. 4) having a pulse width equal to the difference in time between the leading edges of the signals C, D which are issued from the second and third comparators 31, 32.

The arithmetic unit 17 for computing a time difference comprises: a time difference counter 34 connected to the peak detector 26 in the microwave peak detecting device 15 and the first comparator 28 and the correction circuit 33 in the luminous signal processor 16; a clock generator 35 connected to the time difference counter 34 and the correction circuit 33; and a counter 36 connected to the third comparator 32 and the clock generator 35.

The time difference counter 34 comprises an up-down counter and a register, and starts counting up clock pulses from the time when a prior one of a pair of peaks prior and subsequent to the top dead center on the microwave signal is reached and continues to count up clock pulses until the counter 34 receives a reference signal for the luminous signal from the first comparator 28. At the same time that the reference signal is applied to the counter 34, it starts counting down clock pulses and continues to count them down until a peak subsequent to the top dead center on the microwave signal is received. The count is held when the counter 34 receives the peak subsequent to the top dead center. When a signal $\Delta t'$ is supplied from the correction circuit 33 to the counter 34, the latter starts counting down clock pulses again and counts them down continuously while the signal $\Delta t'$ is being applied. When the signal $\Delta t'$ is no longer applied, the count is held in the counter 34. The final count thus held in the counter 34 corresponds to a time difference $(\Delta t - \Delta t')$ between the top dead center corresponding to the middle point between a pair of peaks of the microwave signal and 10% of the peak value of the luminous signal which corresponds to fuel injection timing. The behavior of the time difference counter 34 as it varies is illustrated at F in FIG. 4.

The clock generator 35 generates clock pulses of 100 KHz in the illustrated embodiment, and delivers them to the time difference counter 34, the correction circuit 33, and the counter 36.

The counter 36 comprises a counter and a register for counting the period of points at 10% of the luminous signal peak value based on clock pulses that are of a frequency which is 1/10 of that of the clock pulses generated by the clock generator 35.

The time difference counter 34, the counter 36, and the third comparator 32 produce outputs which are delivered through the I/O interface 18 to the microcomputer μC.

Figure 5:
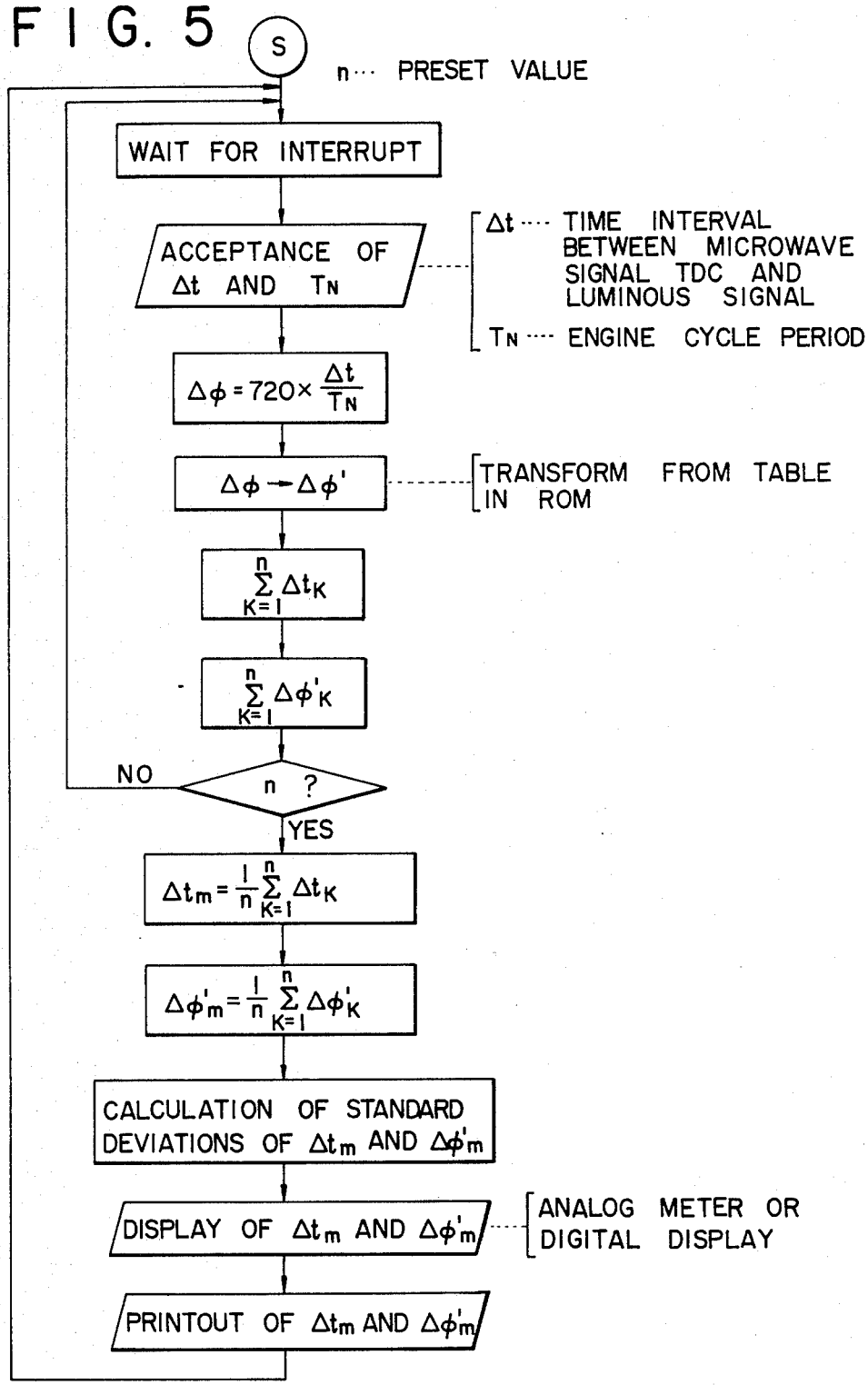

The microcomputer μC has the interface 18, the central processing unit 19, the ROM 20, and the RAM 21 for processing data applied through the I/O interface 18. The data processing is carried out in a process as shown in the flowchart of FIG. 5. An interrupt is effected at the timing of detecting 10% of the peak value of the luminous signal.

The program for performing arithmetic operations according to the process as shown in FIG. 5 is previously stored in the ROM 20.

Main steps to be processed by the microcomputer μC are set forth below, and the first and second aspects described above are executed in the microcomputer μC.

1. Computation of an arithmetic mean and a standard deviation of time differences $\Delta t$ between the middle points of peaks of the microwave signal and 10% of peak values of the luminous signal.

2. Computation of angular differences $\Delta\phi$ in the crank angle based on the time differences $\Delta t$.

3. Computation of an arithmetic mean and a standard deviation of the angular differences $\Delta\phi$.

Injection timing of the fuel injection pump in diesel engines is generally set in terms of a mechanical position relative to a crank shaft, that is, a crank angle. When the engine speed changes, time differences are different from crank angle differences, and hence it is necessary that the engine speed be measured and converted into crank angle differences. Namely, it is indispensable to measure the engine speed in each cycle, offset a variation in the time difference due to an engine speed change, and convert the time difference into a crank angle difference. In the illustrated embodiment, the time difference between a microwave top dead center and a rise time of a luminous signal from the pre-chamber is also divided by the time difference in each cycle for the rise time (10%) of the luminous signal from the pre-chamber, and the calculated time difference ratio is multiplied by 720° for conversion into a crank angle. However, the engine speed is reduced in the vicinity of the top dead center because of the piston needs to compress air and fuel in the cylinder. This engine speed variation in each cycle has conventionally made it difficult to convert the time difference into the crank angle difference. FIG. 6 shows engine speed variations measured on a four-cylinder, four-cycle diesel engine. The waveform 1 is indicative of an engine speed, and the waveform 2 shows top dead center signals generated by a slit in a disc fixed to crank shaft. With the four-cylinder, four-cycle diesel engine, two cylinders are in a power stroke between adjacent top dead centers, that is , in a single revolution, and hence the engine speed drops twice at corresponding positions.

The waveform 3 is equivalent to the waveform 1 with its time base enlarged, and the waveform 4 is indicative of the same top dead center signal as that of the waveform 2. The waveform 5 is representative of a pulse signal generated by a slit in the disc attached to the crank shaft, the pulse signal having pulses each corresponding to a crank angle of 5°. Comparison between the waveforms 3 and 4 shows that the engine speed is at minimum at the top dead center, and these waveforms are symmetrical with respect to the top dead center. The engine speed starts being lowered about 70° in terms of crank angles prior to the top dead center, dropping linearly 30° prior to the top dead center, and then increases linearly from the top dead center until 30° subsequent to the top dead center. This has been confirmed by the result of data analysis made accurately by using a minicomputer. The foregoing indicates that even when the engine speed variation waveform 3 is asymmetrical with respect to the top dead center, the microwave top dead center as determined by the middle point between a pair of peaks will not be affected when the frequency of the microwave oscillator slowly varies.

The waveform 6 is equilalent to the waveform 3 as it is enlarged in its time base, and the waveforms 7, 8 are the same as the waveforms 4, 5, respectively. From comparison between the waveforms 6, 8, it will be seen that the engine speed remains substantially unchanged at 10° subsequent to the top dead center. This has been substantiated by the result of accurate data processing carried out by a minicomputer.

As described above, the time difference detected between the top dead center and the rise time of the luminous signal emitted from th pre-chamber AC is on the order of 5° in terms of a crank angle, and can be converted into a crank angle using a certain conversion coefficient.

The degree by which the engine speed is lowered in the vicinity of the top dead center varies with the engine speed and is more reduced as the engine speed increases.

In the present embodiment, a conversion coefficient f(N) for each engine speed is given by the following equation:

$$f(N) = 0.62 + 0.725(N/1000) - 0.375(N/1000)^2$$

where N is the engine speed in RPM. The correction coefficients are stored in the ROM in the microcomputer in the illustrated embodiment, and are corrected by so-called mapping.

The corrective procedure will be described once again. The engine speed is measured in each cycle, and the time difference between the top dead center and the rise time of the luminous signal emitted from the pre-chamber is first converted into a crank angle difference based on the engine speed. Then, the crank angle difference is multiplied by a conversion coefficient f(N) for the engine speed to determine an accurate crank angle difference.

Since conversion coefficients for use in time-to-angle conversion are given as a function of the engine speed, arithmetic operations to be carried out are much simpler to perform.

While in the illustrated embodiment conversion coefficients are stored in a memory, they can be determined on a real-time basis by detecting the engine speed and effecting arithmatic operations thereon in an arithmetic circuit.

The display unit IV comprises analog meters AM1, AM2 connected respectively through the D/A converters 22, 23 to the I/O interface 18 in the microcomputer μC, and digital display devices DD1, DD2, DD3 coupled directly to the I/O interface 18.

Operation and advantages of the apparatus thus constructed according to the embodiment will be described hereinbelow.

A microwave delivered from the microwave oscillator 1 in the microwave unit I is transmitted by the circulator 2 over the coaxial microwave cable FC connected to the microwave connector 6 in the probe II. The microwave is then converted by the coaxial waveguide converter 7 into a waveguide mode (TE mode), passes through the waveguide 7, is converted by a coaxial waveguide converter 7 into a coaxial mode (TEM mode), is guided along the coaxial air line into the pre-chamber AC, and is finally introduced through the communication throat CH into the main chamber MC. When the piston in the main chamber MC is not in a resonance position, the microwave is reflected and transmitted back over the same route into the circulator 2 through the coaxial microwave cable FC. The reflected microwave is separated from the transmitted microwave in the circulator 2, and enters the detector 3 in which the microwave is detected and converted into a low-frequency electric signal, which is then fed to the processor III. The photodiode 14 generates a luminous signal upon ignition and combustion in the pre-chamber AC.

The peak detector 15 in the processor III processes the low-frequency microwave signal issued by the detector 3 in the microwave unit I. The luminous signal processing unit 16 processes the luminous signal generated by the probe II. Thereafter, the arithmetic unit 17 computes a time difference $\Delta t - \Delta t'$ between the middle point between a pair of peaks of the microwave signal and 10% of the peak value of the luminous signal, that is, a signal indicative of a time difference bewteen the top dead center and the fuel injection timing, and an angle difference signal indicative of the time difference in terms of a crank angle.

The display unit IV is responsive to the time difference signal and the angle difference signal issued by the processor III for displaying fuel injection timing and an injection angle on the analog meters AM1, AM2 and the digital display devices DD1, DD2, DD3.

The apparatus of the foregoing construction operable in the above manner is advantageous in that fuel injection timing with respect to the top dead center can accurately be detected through a simple system even when the engine operating condition varies.

The present embodiment is capable of accurately detecting fuel injection timing with respect to the top dead center as a crank angle dependent on the engine speed based on a stored conversion coefficient, without employing a sensor such as an encoder, thus making subsequent control reliable.

The present embodiment is also advantageous in that the accuracy can be increased by finding an arithmetic mean of signals and monitoring a standard deviation at all times through statistical processing, thereby detecting malfunctions of the engine and the probe.

The present embodiment is further advantageous in that systematization is achieved by a hybrid arrangement including a microcomputer and other hardware which effect their respective functions to facilitate arithmetic operations for a high-speed phenomenon such as a microwave.

The present embodiment is additionally advantageous in that the apparatus comprises a simple system which can be mounted and detached with ease, is highly reliable in operation, and hence can sufficiently be put to use on a production line.

Although a certain preferred embodiment has been described in detail, it should be understood that the present invention is not limited to the illustrated embodiment, but changes, deletions and additions of components may be made therein as desired without departing from the scope of the appended claims.

What is claimed is:

1. An apparatus for detecting combustion timing in an internal combustion engine comprising:

a microwave unit comprising a microwave oscillator for generating a microwave having a predetermined frequency, a transmission and reception separator connected to said microwave oscillator, for separating transmitted and received microwaves from each other, and a detector connected to said transmission and reception separator, for detecting the received microwave so as to be converted to a low frequency signal;

a probe means comprising a microwave sensor connected to said separator, for radiating the microwave from said separator into a combustion chamber of said internal combustion engine and receiving a reflected wave, and a light sensor for electrically detecting light emitted upon combustion in the combustion chamber; and a processing unit comprising a peak detector circuit, connected to said detector of said microwave unit, for detecting peaks of a microwave signal supplied by said detector, a luminous signal processor, connected to said light sensor of said probe means, for detecting a peak value of a luminous signal supplied by said light sensor in each cycle and also detecting the time when the luminous signal reaches an intensity having a predetermined proportion to the peak value thereof, and an operating unit, connected to said peak detector and luminous signal processor, for operating a time difference between a middle point between a pair of peaks of the microwave signal and the time when the luminous signal reaches an intensity having a predetermined portion to the peak value thereof based on peak and luminous signals, thereby detecting the timing for starting combustion with respect to a top dead center of said internal combustion engine.

2. An apparatus according to claim 1, wherein said processing unit further comprises a crank angle converter, connected to said operating unit, for converting the time difference signal operated by said operating unit to a crank angle difference signal based on a predetermined conversion coefficient which is dependent on a speed of said internal combustion engine.

3. An apparatus according to claim 1, wherein said processing unit further comprises an averaging and statistically processing unit, connected to said operating unit, for arithmetically averaging the time difference signal, statistically processing the averaged time difference signal to obtain a standard deviation, and confirming the standard deviation to be fallen within a predetermined range.

4. An apparatus according to claim 3, wherein said peak detector, luminous signal processor, and operating unit of said processing unit comprises hardwares, and said crank angle converter and said averaging and statistic processing unit of said processing unit comprises a microcomputer operated by a pre-memorized program, thereby effecting respective functions to facilitate arithmetic operations for a high-speed phenomenon such as a microwave.

5. An apparatus according to claim 4, further comprising a display means, connected to said processing unit, for displaying the timing for starting combustion with respect to the top dead center thereof based on an output signal of said processing unit.

6. An apparatus according to claim 5, wherein said microwave oscillator of said microwave unit comprises a solid-state oscillating device, a gunn diode attached to a waveguide resonator for varying the frequency in the range of ±250 MHz, and a varactor diode for effecting electronic tuning up to a maximum of 80 MHz, and connects to a DC constant-voltage regulated power supply through a relay means and EMI filter, said transmission and reception separator thereof comprises a three-terminal circulator having one terminal connected to said microwave oscillator through a flexible coaxial microwave cable and another terminal connected to said probe through a flexible coaxial microwave cable, and said detector is connected to the other terminal of said circulator through a flexible coaxial cable and is of a negative polarity such that a negative voltage becomes higher as the microwave intensity increases.

7. An apparatus according to claim 6, wherein said probe means comprises a hollow cylindrical body, a chamber body formed in said hollow cylindrical body, a microwave connector secured to said chamber and connected to said circulator through a flexible microwave cable, two metal tubes of different diameters coaxially provided and annular window members of quartz located at upper and lower ends for serving as both support spacers and seals, an upper end of said smaller metal tube being projected into said chamber and a lower end thereof being projected from a lower end of said hollow cylindrical body within a predetermined length for serving as a dipole antenna, and a photodiode provided opposed to said upper end of said smaller metal tube in said chamber.

8. An apparatus according to claim 7, wherein said peak detector circuit of said processing unit comprises an amplifier connected to said detector of said microwave unit, a bandpass filter connected to said amplifier and a peak detector coupled to the bandpass filter, said luminous signal prosessor thereof comprises an amplifier connected to said photodiode of said probe means, a first comparator connected to said amplifier, a peak hold circuit connected to said amplifier and having a reset terminal connected to a correction circuit, a B.B.D. circuit as a delay circuit, connected to said amplifier, for delaying the luminous signal for a predetermined interval of time, a second comparator connected to an output terminal of said B.B.D. circuit, a third comparator connected to an output terminal of said peak hold circuit and said output terminal of said B.B.D. circuit, and said correction circuit connected to said first through third comparators, and said operating unit thereof comprises a time difference counter connected to said peak detector, said first comparator and said correction circuit, a clock generator, connected to said time difference counter and said correction circuit, for generating a clock pulse of a predetermined frequency, and a counter connected to said third comparator and said clock generator, for counting the period of points at 10% of the luminous signal peak based on clock pulses.

9. An apparatus according to claim 8, further comprising a microcomputer comprising an I/O interface connected to said time difference counter, said counter and said third comparator, a centeral processing unit connected to said I/O interface, a ROM, conneced to said central processing unit and storing a program and a conversion coefficient for each revolution of said engine, for computing a crank angle, an arithmetic averaging and a statistic processing, a RAM connected to said central processing unit and storing data.

10. An apparatus according to claim 9, further comprisng a display unit comprising analog meters respectively conected to said I/O interface of said microcomputer through D/A converters and digital displays directly connected to said I/O interface of said microcomputer.

11. An apparatus according to claim 1, wherein said luminous signal processor of said processing unit detects the time when the luminous signal reaches a 10% intensity to the peak value thereof.

12. An apparatus according to claim 11, wherein said luminous signal processor comprises a delay circuit for delaying the luminous signal for a predetermined interval of time, and a comparator for comparing the luminous signal and delayed luminous signal.

13. An apparatus according to claim 1, wherein said peak detector of said processing unit detects a pair of peaks which are nearest to the top dead center of said engine.

14. An apparatus according to claim 1, wherein said microwave oscillator of said microwave unit generates a microwave having 18 GHz.

15. An apparatus according to claim 1, wherein said microwave sensor of said probe radiates the microwave from said microwave unit from a pre-chamber to a main chamber of said engine through a connecting hole thereof.

16. An apparatus according to claim 1, wherein said light sensor of said probe comprises a photodiode, provided to oppose hole means for supplying light emitted from a pre-chamber of said engine, for converting the detected light to an electric luminous signal.

* * * * *